US011215286B2

(12) United States Patent
Li et al.

(10) Patent No.: US 11,215,286 B2
(45) Date of Patent: Jan. 4, 2022

(54) MAGNETIC LIQUID SEALING DEVICE ADAPTED TO AXIAL AND RADIAL DISPLACEMENTS OF CONNECTION

(71) Applicant: Tsinghua University, Beijing (CN)

(72) Inventors: Decai Li, Beijing (CN); Siyu Chen, Beijing (CN); Xiao Liu, Beijing (CN); Qian Li, Beijing (CN); Rui Sun, Beijing (CN); Jixian Yang, Beijing (CN); Zhenghao Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 86 days.

(21) Appl. No.: 16/765,206

(22) PCT Filed: Jul. 4, 2018

(86) PCT No.: PCT/CN2018/094466
§ 371 (c)(1),
(2) Date: May 19, 2020

(87) PCT Pub. No.: WO2020/006700
PCT Pub. Date: Jan. 9, 2020

(65) Prior Publication Data
US 2020/0278031 A1    Sep. 3, 2020

(51) Int. Cl.
*F16J 15/43* (2006.01)
*F16C 33/66* (2006.01)
(Continued)

(52) U.S. Cl.
CPC ........... *F16J 15/43* (2013.01); *F16C 33/6644* (2013.01); *F16C 33/765* (2013.01); *F16C 35/045* (2013.01); *F16J 15/3276* (2013.01)

(58) Field of Classification Search
CPC ...... F16J 15/3276; F16J 15/3464; F16J 15/43; F16C 33/6644; F16C 33/765; F16C 35/045
See application file for complete search history.

(56) References Cited

U.S. PATENT DOCUMENTS 4,054,293 A * 10/1977 Hoeg ................. F16J 15/42
277/410
5,007,513 A * 4/1991 Carlson ............. F16D 37/008
192/21.5
(Continued)

FOREIGN PATENT DOCUMENTS

CN    2473397    1/2002
CN    103267131    8/2013
(Continued)

OTHER PUBLICATIONS

ISA/CN, International Search Report for PCT/CN2018/094466, dated Dec. 26, 2018.
(Continued)

*Primary Examiner* — Nicholas L Foster
(74) *Attorney, Agent, or Firm* — Hodgson Russ LLP

(57) ABSTRACT

The present disclosure discloses a magnetic liquid sealing device adapted to axial and radial displacements of connection, which includes: an end cover; a rubber-sealing-ring equipped first clamping plate fixed on the end cover by a first screw and a second screw; a rubber-sealing-ring equipped second clamping plate installed in a groove of the end cover; a fundamental sealing structure fixed on the rubber-sealing-ring equipped second clamping plate by a third screw and a fourth screw, so as to be isolated from the end cover by the rubber-sealing-ring equipped first clamping plate and the rubber-sealing-ring equipped second clamping plate. The device isolates the connected component from the magnetic liquid sealing structure by the two clamping plates, such that (Continued)

the axial and radial deformations and displacements of the connected component will not be loaded on parts in magnetic liquid sealing structure, prolonging the service life of the magnetic liquid sealing.

6 Claims, 1 Drawing Sheet

(51) Int. Cl.
*F16C 33/76* (2006.01)
*F16C 35/04* (2006.01)
*F16J 15/3276* (2016.01)

(56) References Cited

U.S. PATENT DOCUMENTS

| | | | | |
|---|---|---|---|---|
| 8,047,549 B2* | 11/2011 | Kung | ............... | F16J 15/43 |
| | | | | 277/410 |
| 8,419,019 B2* | 4/2013 | Kung | ............ | F16J 15/002 |
| | | | | 277/410 |
| 11,125,337 B1* | 9/2021 | Li | ............... | F16J 15/43 |
| 2010/0171271 A1* | 7/2010 | Kung | ............... | F16J 15/43 |
| | | | | 277/410 |
| 2011/0210519 A1* | 9/2011 | Li | ............... | F16J 15/43 |
| | | | | 277/410 |
| 2012/0018958 A1* | 1/2012 | Kung | ............... | F16J 15/43 |
| | | | | 277/410 |

FOREIGN PATENT DOCUMENTS

| | | |
|---|---|---|
| CN | 106195026 | 12/2016 |
| JP | S6256394 | 11/1987 |
| JP | S6465341 | 3/1989 |

OTHER PUBLICATIONS

WIPO, International Search Report and Written Opinion for PCT/CN2018/094466, dated Dec. 26, 2018.

* cited by examiner

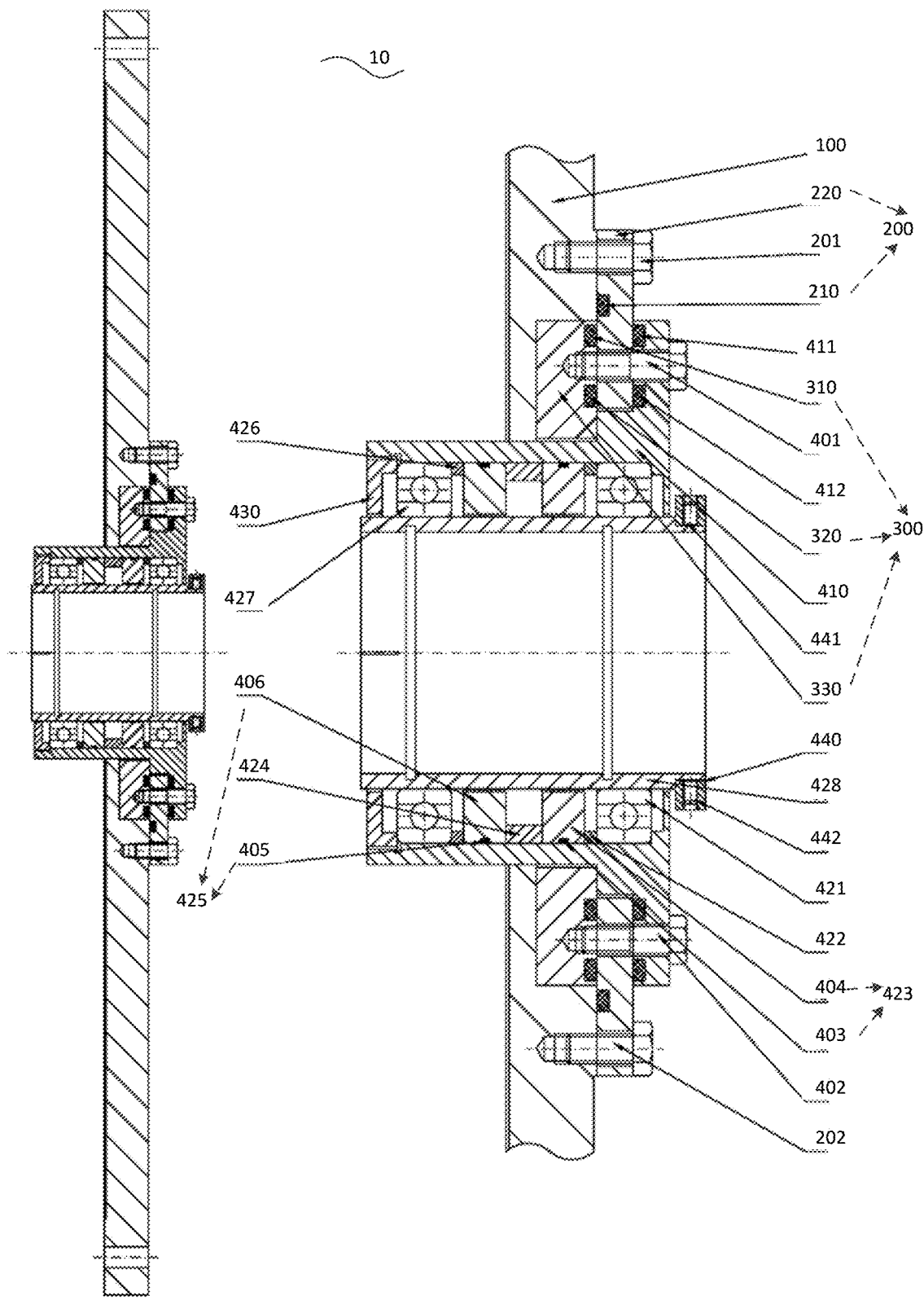

MAGNETIC LIQUID SEALING DEVICE ADAPTED TO AXIAL AND RADIAL DISPLACEMENTS OF CONNECTION

CROSS-REFERENCE TO RELATED APPLICATION

This application is a U.S. national phase application of International Application No. PCT/CN2018/094466, filed Jul. 4, 2018, the entire disclosure of which is hereby incorporated by reference herein.

FIELD

The present disclosure relates to a field of mechanical engineering sealing technology, and more particularly to a magnetic liquid sealing device adapted to axial and radial displacements of connection.

BACKGROUND

Magnetic liquid is a new type of functional material combining the fluidity of liquid and the response characteristics of solid magnetic material to magnetic field, which has a widespread application in the engineering field, and magnetic liquid sealing technology is one of many applications of magnetic liquid. Magnetic liquid sealing technology has advantages of zero leakage, no wear, long service life and convenient maintenance, which is widely applied in different sealing occasions of various industries. In a field of chemical industry, the magnetic liquid sealing device is often connected with an end cover, a flange or other structures with a large-diameter. Since the end cover, the flange or other structures have large diameters and will experience large deformation when being under stress or heat. Therefore, portions connected with the magnetic liquid sealing device will generate axial or radial displacement, such that components of the magnetic liquid sealing device are subjected to large axial force or radial force, affecting performance in use and shortening the service lift of the magnetic liquid sealing device.

SUMMARY

The present disclosure aims to solve at least one of technical problems in the related art to a certain extent.

To this end, an objective of the present disclosure is to propose a magnetic liquid sealing device adapted to axial and radial displacements of connection, which enables that deformations and displacements of the connected component will not be loaded on parts in magnetic liquid fundamental sealing structure, thereby prolonging the service life of the magnetic liquid sealing.

To achieve the above objective, embodiments of a first aspect of the present disclosure propose a magnetic liquid sealing device adapted to axial and radial displacements of connection, which includes: an end cover; a rubber-sealing-ring equipped first clamping plate fixed on the end cover by a first screw and a second screw, the rubber-sealing-ring equipped first clamping plate including a first rubber sealing ring and a first clamping plate, the first rubber sealing ring being mounted in a groove of the first clamping plate; a rubber-sealing-ring equipped second clamping plate installed in a groove of the end cover, the rubber-sealing-ring equipped second clamping plate including a second rubber sealing ring, a third rubber sealing ring and a second clamping plate, the second rubber sealing ring and the third rubber sealing ring being mounted in a groove of the second clamping plate; a fundamental sealing structure fixed on the rubber-sealing-ring equipped second clamping plate by a third screw and a fourth screw, so as to be isolated from the end cover by the rubber-sealing-ring equipped first clamping plate and the rubber-sealing-ring equipped second clamping plate.

The magnetic liquid sealing device adapted to axial and radial displacements of connection according to embodiments of the present disclosure isolates the connected component from the magnetic liquid sealing structure by two clamping plates, which overcomes the axial and radial displacements of the connection caused by the axial and radial deformations and displacements of the end cover, the flange or other structures connected with the magnetic liquid sealing structure, such that deformations and displacements of the connected component will not be loaded on the parts in magnetic liquid fundamental sealing structure, prolonging the service life of the magnetic liquid sealing.

In addition, the magnetic liquid sealing device adapted to axial and radial displacements of connection according to the above embodiment also may have the following additional technical features:

Furthermore, in one embodiment of the present disclosure, the fundamental sealing structure further includes: a housing, a fourth rubber sealing ring and a fifth rubber sealing ring being mounted in a groove of the housing; a seal-group equipped shaft sleeve installed in the housing, the seal-group equipped shaft sleeve including a right rolling bearing, a right magnetic isolating ring, a rubber-sealing-ring equipped right pole shoe, an annular permanent magnet, a rubber-sealing-ring equipped left pole shoe, a left magnetic isolating ring, a left rolling bearing and a shaft sleeve, the right rolling bearing, the right magnetic isolating ring, the rubber-sealing-ring equipped right pole shoe, the annular permanent magnet, the rubber-sealing-ring equipped left pole shoe, the left magnetic isolating ring and the left rolling bearing being successively fitted over an outside of the shaft sleeve; a left end ring fitted over one side of the outside of the seal-group equipped shaft sleeve and rotationally screwed into a thread of an inner wall of the housing; and a right end ring fitted over the other side of the outside of the seal-group equipped shaft sleeve, a first set screw and a second set screw being screwed in the right end ring.

Furthermore, in one embodiment of the present disclosure, the rubber-sealing-ring equipped right pole shoe includes a sixth rubber sealing ring and a right pole shoe, and the sixth rubber sealing ring is mounted in a groove of the right pole shoe; the rubber-sealing-ring equipped left pole shoe includes a seventh rubber sealing ring and a left pole shoe, and the seventh rubber sealing ring is mounted in a groove of the left pole shoe.

Furthermore, in one embodiment of the present disclosure, both the left pole shoe and the right pole shoe are magnetic materials, and inner walls of the left pole shoe and the right pole shoe are processed with pole teeth and tooth slots, 2 to 10 pole teeth are provided for each pole shoe, a width of the pole tooth is at least 0.3 mm, and a width of the tooth slot is at least 0.5 mm.

Furthermore, in one embodiment of the present disclosure, a sealing gap between the rubber-sealing-ring equipped left pole shoe, the rubber-sealing-ring equipped right pole shoe and the shaft sleeve is 0.001 to 1 mm, and the sealing gap is filled with magnetic liquid to achieve dynamic sealing.

Furthermore, in one embodiment of the present disclosure, materials of the left magnetic isolating ring, the right magnetic isolating ring and the housing are non-magnetic materials.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the present disclosure will become apparent and readily appreciated from the following descriptions of embodiments made with reference to the drawings.

FIG. 1 is a schematic view of a magnetic liquid sealing device adapted to axial and radial displacements of connection according to an embodiment of the present disclosure.

REFERENCE NUMERALS magnetic liquid sealing device 10 adapted to axial and radial displacements of connection, end cover 100, rubber-sealing-ring equipped first clamping plate 200, first screw 201, second screw 202, first rubber sealing ring 210, first clamping plate 220, rubber-sealing-ring equipped second clamping plate 300, second rubber sealing ring 310, third rubber sealing ring 320, second clamping plate 330, third screw 401, fourth screw 402, sixth rubber sealing ring 403, right pole shoe 404, seventh rubber sealing ring 405, left pole shoe 406, housing 410, fourth rubber sealing ring 411, fifth rubber sealing ring 412, right rolling bearing 421, right magnetic isolating ring 422, rubber-sealing-ring equipped right pole shoe 423, annular permanent magnet 424, rubber-sealing-ring equipped left pole shoe 425, left magnetic isolating ring 426, left rolling bearing 427, shaft sleeve 428, left end ring 430, right end ring 440, first set screw 441, second set screw 442.

DETAILED DESCRIPTION

Embodiments of the present disclosure are further described below. Examples of the embodiments are illustrated in the accompanying drawings. Same or similar reference signs represent the same or similar components or components that have the same or similar functions throughout the description. The embodiments described below with reference to the accompanying drawings are exemplary, are merely used to explain the present disclosure, and cannot be construed as a limitation to the present disclosure.

A magnetic liquid sealing device adapted to axial and radial displacements of connection according to embodiments of the present disclosure will be described as follows with reference to the drawings.

FIG. 1 is a schematic view of a magnetic liquid sealing device adapted to axial and radial displacements of connection according to an embodiment of the present disclosure.

As illustrated in FIG. 1, the magnetic liquid sealing device 10 adapted to axial and radial displacements of connection includes an end cover 100, a rubber-sealing-ring equipped first clamping plate 200, a rubber-sealing-ring equipped second clamping plate 300 and a fundamental sealing structure 400 (not specifically identified in FIG. 1).

As for the end cover 100, the rubber-sealing-ring equipped first clamping plate 200 is fixed on the end cover 100 by a first screw 201 and a second screw 202. The rubber-sealing-ring equipped first clamping plate 200 includes a first rubber sealing ring 210 and a first clamping plate 220, and the first rubber sealing ring 210 is mounted in a groove of the first clamping plate 220. The rubber-sealing-ring equipped second clamping plate 300 is installed in a groove of the end cover 100. The rubber-sealing-ring equipped second clamping plate 300 includes a second rubber sealing ring 310, a third rubber sealing ring 320 and a second clamping plate 330, and the second rubber sealing ring 310 and the third rubber sealing ring 320 are mounted in a groove of the second clamping plate 330. The fundamental sealing structure 400 is fixed on the rubber-sealing-ring equipped second clamping plate 300 by a third screw 401 and a fourth screw 402, so as to be isolated from the end cover 100 by the rubber-sealing-ring equipped first clamping plate 200 and the rubber-sealing-ring equipped second clamping plate 300. The device 10 of the embodiment of the present disclosure isolates the connected component from the magnetic liquid sealing structure by the two clamping plates, such that deformations and displacements of the connected component will not be loaded on parts in magnetic liquid fundamental sealing structure, thereby prolonging the service life of the magnetic liquid sealing.

Specifically, as illustrated in FIG. 1, in the embodiment of the present disclosure the second clamping plate 330 is installed in the groove of the end cover 100, the third rubber sealing ring 310 and the fifth rubber sealing ring 320 are mounted in the groove of the second clamping plate 330, the first rubber sealing ring 210 is mounted in the groove of the first clamping plate 220 to form the rubber-sealing-ring equipped first clamping plate 200, the rubber-sealing-ring equipped first clamping plate 200 is fixed on the end cover 100 by the first screw 201 and the second screw 202, and the fundamental sealing structure 400 is fixed on the second clamping plate 330 by the third screw 401 and the fourth screw 402.

When the device 10 of the embodiment of the present disclosure operates, the fundamental sealing structure 400 for the magnetic liquid sealing is fixed on the end cover 100, a flange, or other structures of a device that needs to be sealed by means of the first clamping plate 220 and the second clamping plate 330, and the end cover 100, the flange, or other structures of the device that needs to be sealed is isolated from the fundamental sealing structure 400 for the magnetic liquid sealing, such that axial and radial deformations and displacements of the connected component will not be loaded on parts in magnetic liquid fundamental sealing structure 400, thereby prolonging the service life of the magnetic liquid sealing.

Furthermore, in one embodiment of the present disclosure, the fundamental sealing structure 400 further includes: a housing 410, a seal-group equipped shaft sleeve 420 (not specifically identified in FIG. 1), a left end ring 430 and a right end ring 440.

A fourth rubber sealing ring 411 and a fifth rubber sealing ring 412 are mounted in a groove of the housing 410, and the seal-group equipped shaft sleeve 420 is installed in the housing 410. The seal-group equipped shaft sleeve 420 includes a right rolling bearing 421, a right magnetic isolating ring 422, a rubber-sealing-ring equipped right pole shoe 423, an annular permanent magnet 424, a rubber-sealing-ring equipped left pole shoe 425, a left magnetic isolating ring 426, a left rolling bearing 427 and a shaft sleeve 428. The right rolling bearing 421, the right magnetic isolating ring 422, the rubber-sealing-ring equipped right pole shoe 423, the annular permanent magnet 424, the rubber-sealing-ring equipped left pole shoe 425, the left magnetic isolating ring 426 and the left rolling bearing 427 are successively fitted over an outside of the shaft sleeve 428. The left end ring 430 is fitted over one side of the outside of the seal-group equipped shaft sleeve 420 and rotationally screwed into a thread of an inner wall of the housing. The right end ring 440 is fitted over the other side of the outside of the seal-group equipped shaft sleeve, a first set screw 441 and a second set screw 442 are screwed in the right end ring 440.

In one embodiment of the present disclosure, the rubber-sealing-ring equipped right pole shoe 423 includes a sixth rubber sealing ring 403 and a right pole shoe 404, and the sixth rubber sealing ring 403 is mounted in a groove of the right pole shoe 404. The rubber-sealing-ring equipped left pole shoe 425 includes a seventh rubber sealing ring 405 and a left pole shoe 406, and the seventh rubber sealing ring 405 is mounted in a groove of the left pole shoe 406.

Specifically, as illustrated in FIG. 1, the sixth rubber sealing ring 403 is mounted in the groove of the right pole shoe 404 to form the rubber-sealing-ring equipped right pole shoe 423, and the seventh rubber sealing ring 405 is mounted in the groove of the left pole shoe 406 to form the rubber-sealing-ring equipped left pole shoe 425. The right rolling bearing 421, the right magnetic isolating ring 422, the rubber-sealing-ring equipped right pole shoe 423, the annular permanent magnet 424, and the rubber-sealing-ring equipped left pole shoe 425, the left isolating ring 426 and the left rolling bearing 427 are successively fitted over the outside of the shaft sleeve 428 to form the seal-group equipped shaft sleeve 420. The seal-group equipped shaft sleeve 420 is mounted into the housing 410. The left end ring 430 is fitted over the outside of the shaft sleeve 420 and rotationally screwed into the thread of the inner wall of the housing 410. The right end ring 440 is fitted over the outside of the shaft sleeve 420, and the first set screw 441 and the second set screw 442 are screwed in the right end ring 440. The second rubber sealing ring 411, the fourth rubber sealing ring 412 are mounted in the groove of the housing 410. So far, the mounting of the fundamental sealing structure 400 for the magnetic liquid sealing is completed.

Furthermore, in one embodiment of the present disclosure, both the left pole shoe 406 and the right pole shoe 404 are magnetic materials. The inner walls of the left pole shoe 406 and the right pole shoe 406 are processed with pole teeth and tooth slots. The number of pole teeth of each pole shoe is 2 to 10, a width of the pole tooth is at least 0.3 mm, and a width of the tooth slot is at least 0.5 mm. That is, the width of the pole tooth is greater than 0.3 mm, and the width of the tooth slot is greater than 0.5 mm.

Furthermore, in one embodiment of the present disclosure, the materials of the left magnetic isolating ring 426, the right magnetic isolating ring 422 and the housing 410 are non-magnetic materials.

Specifically, the left magnetic isolating ring 426 and right magnetic isolating ring 422 may be a circular ring structure with non-magnetic material such as stainless steel, which are not specifically limited herein.

Furthermore, in one embodiment of the present disclosure, a sealing gap between the rubber-sealing-ring equipped left pole shoe 423, the rubber-sealing-ring equipped right pole shoe 425 and the shaft sleeve 428 is 0.001 to 1 mm, and the sealing gap is filled with magnetic liquid to achieve dynamic sealing.

That is, the sealing gap between the left pole shoe 406, the right pole shoe 404 and the shaft sleeve 428 may be selected from a range of 0.001 to 1 mm. The materials of the left pole shoe 406, the right pole shoe 404 and the shaft sleeve 428 are selected from materials with good magnetic conductivity, such as electrical pure iron, which may be arranged by those skilled in the related art according to actual situation without specific limitation herein. The type of magnetic liquid may be selected from magnetic liquids with different base carrier liquids according to different sealing gases and environmental temperatures under actual operating condition. Generally, ester based magnetic liquid, fluorocarbon based magnetic liquid or silicone oil-based magnetic liquid may be selected for vacuum sealing, and silicone oil-based magnetic liquid may be selected for low-temperature sealing.

Furthermore, the left rolling bearing 427 and the right rolling bearing 421 may be selected from different types of bearings according to applied forces in axial and radial directions under actual operating condition, such as a deep groove ball bearing or an angular contact ball bearing. A material of the annular permanent magnet 424 may be ferromagnetic, such as Nd—Fe—B. The left end ring 430 may be a circular ring structure with a thread processed on the outside thereof, which may be screwed with the thread on the inner wall of the housing 410, and the parts on the shaft sleeve may be axially positioned when the thread are tightly screwed. The right end ring 440 may be a circular ring structure with 2 to 6 threaded holes in a wall face thereof. When the magnetic liquid sealing device is connected with a shaft during operation, the shaft can be clamped tightly by the set screws in respective threaded holes.

To sum up, the device 10 according to embodiments of the present disclosure isolates the connected component from the magnetic liquid sealing structure by the clamping plates, the axial and radial deformations and displacements of the connected component will not be loaded on parts in magnetic liquid sealing structure, and the service life of the magnetic liquid sealing may be extended. Thus, the problem that when the magnetic liquid sealing device is mounted on an end cover or flange with large diameter, the components in the magnetic liquid sealing structure are subjected to large axial force or radial force and the sealing life is shortened due to large deformation of end cover or flange when being under stress or heat is effectively solved.

The magnetic liquid sealing device adapted to axial and radial displacements of connection according to embodiments of the present disclosure isolates the connected component from the magnetic liquid sealing structure by the two clamping plates, which overcomes the axial and radial displacements of the connection caused by the axial and radial deformations and displacements of the end cover, the flange or other structures connected with the magnetic liquid sealing structure, such that deformations and displacements of the connected component will not be loaded on parts in magnetic liquid fundamental sealing structure, prolonging the service life of the magnetic liquid sealing.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, such as two, three and so on, unless specified otherwise.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What is claimed is:

1. A magnetic liquid sealing device adapted to axial and radial displacements of connection comprising:
    an end cover;
    a rubber-sealing-ring equipped first clamping plate fixed on the end cover by a first screw and a second screw, the rubber-sealing-ring equipped first clamping plate comprising a first rubber sealing ring, the first rubber sealing ring being mounted in a groove of the first clamping plate;
    a rubber-sealing-ring equipped second clamping plate installed in a groove of the end cover, the rubber-sealing-ring equipped second clamping plate comprising a second rubber sealing ring and a third rubber sealing ring, the second rubber sealing ring and the third rubber sealing ring being mounted in a groove of the second clamping plate; and
    a fundamental sealing structure fixed on the rubber-sealing-ring equipped second clamping plate by a third screw and a fourth screw, so as to be isolated from the end cover by the first rubber-sealing-ring equipped clamping plate and the rubber-sealing-ring equipped second clamping plate.

2. The magnetic liquid sealing device adapted to axial and radial displacements of connection according to claim 1, wherein the fundamental sealing structure further comprises:
    a housing, a fourth rubber sealing ring and a fifth rubber sealing ring, each being mounted in a groove of the housing;
    a seal-group equipped shaft sleeve installed in the housing, the seal-group equipped shaft sleeve comprising a right rolling bearing, a right magnetic isolating ring, a rubber-sealing-ring equipped right pole shoe, an annular permanent magnet, a rubber-sealing-ring equipped left pole shoe, a left magnetic isolating ring, a left rolling bearing and a shaft sleeve, the right rolling bearing, the right magnetic isolating ring, the rubber-sealing-ring equipped right pole shoe, the annular permanent magnet, the rubber-sealing-ring equipped left pole shoe, the left magnetic isolating ring and the left rolling bearing being successively fitted over an outside of the shaft sleeve;
    a left end ring fitted over a first side of the outside of the seal-group equipped shaft sleeve and rotationally screwed into a thread of an inner wall of the housing; and
    a right end ring fitted over a second side of the outside of the seal-group equipped shaft sleeve opposite the first side in an axial direction of the seal-group equipped shaft sleeve, a first set screw and a second set screw being screwed in the right end ring.

3. The magnetic liquid sealing device adapted to axial and radial displacements of connection according to claim 2, wherein:
    the rubber-sealing-ring equipped right pole shoe comprises a sixth rubber sealing ring, and the sixth rubber sealing ring is mounted in a groove of the right pole shoe; and
    the rubber-sealing-ring equipped left pole shoe comprises a seventh rubber sealing ring, and the seventh rubber sealing ring is mounted in a groove of the left pole shoe.

4. The magnetic liquid sealing device adapted to axial and radial displacements of connection according to claim 3, wherein both the left pole shoe and the right pole shoe are magnetic materials, inner walls of the left pole shoe and the right pole shoe comprise pole teeth and tooth slots, 2 to 10 pole teeth are provided for each pole shoe, a width of each pole tooth is at least 0.3 mm, and a width of each tooth slot is at least 0.5 mm.

5. The magnetic liquid sealing device adapted to axial and radial displacements of connection according to claim 2, wherein a sealing gap between the rubber-sealing-ring equipped left pole shoe, the rubber-sealing-ring equipped right pole shoe and the shaft sleeve is 0.001 to 1 mm, and the sealing gap is filled with magnetic liquid to achieve dynamic sealing.

6. The magnetic liquid sealing device adapted to axial and radial displacements of connection according to claim 2, wherein materials of the left magnetic isolating ring, the right magnetic isolating ring and the housing are non-magnetic materials.

* * * * *